June 1, 1954   W. A. CARTER ET AL   2,679,770
TOOL SELECTIVE DEVICE
Filed July 16, 1953
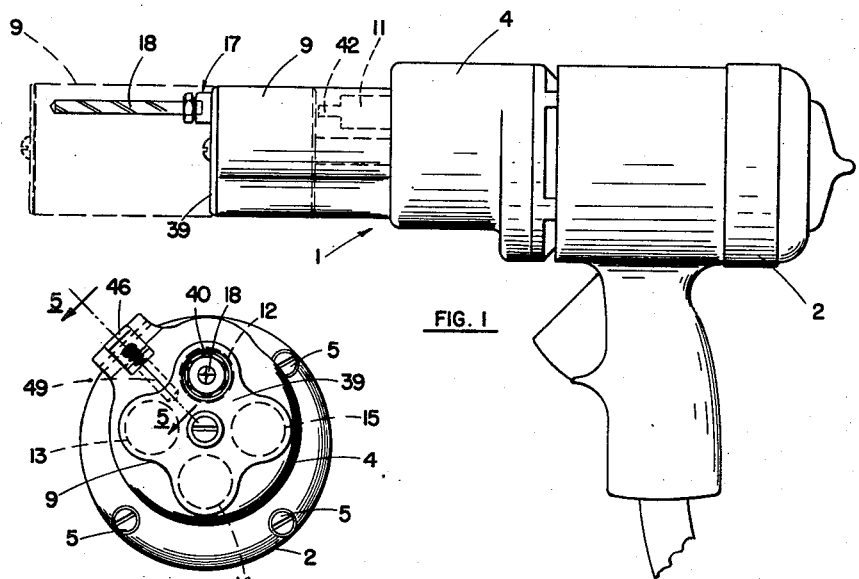
FIG. 1
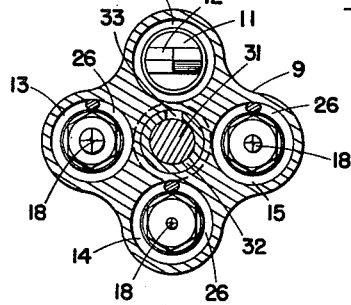
FIG. 3
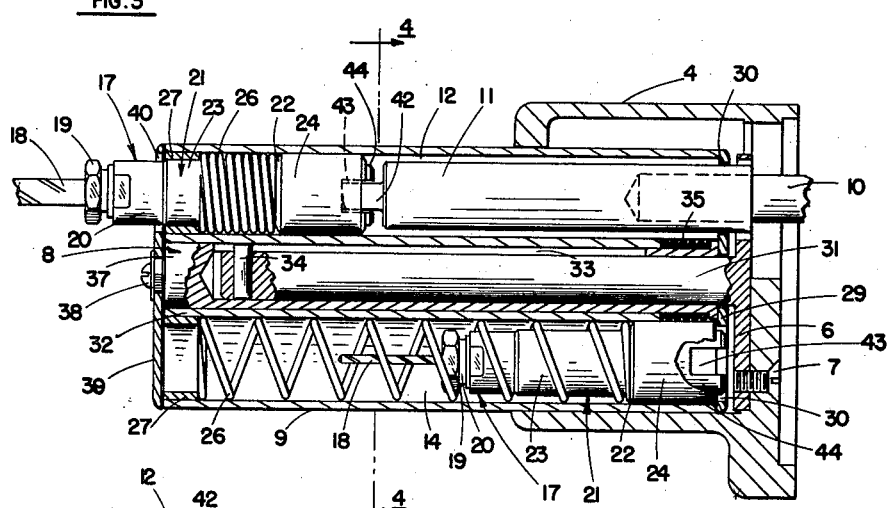
FIG. 2
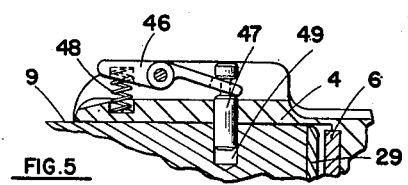
FIG. 5
FIG. 4
INVENTORS
WILLIAM A. CARTER
FREDERICK WYTHE
BY
William R. Lane
ATTORNEY Patented June 1, 1954

2,679,770

UNITED STATES PATENT OFFICE 2,679,770

TOOL SELECTIVE DEVICE

William A. Carter, Johnstown, Pa., and Frederick Wythe, Los Angeles, Calif., assignors to North American Aviation, Inc.

Application July 16, 1953, Serial No. 368,366

10 Claims. (Cl. 77—25)

This invention pertains to a tool selective device and more particularly to a device for conveniently and quickly selecting and operating a variety of rotatable tools.

Selecting and operating a desired tool has always been a problem from the standpoint of the amount of time required for manually performing the job or the expense of the equipment necessary for an automatic arrangement. For example, with a hand drill it may be desired to use several different drill bit sizes on one job. When this is the case for volume production work the time required in manually selecting and changing the drill bits for this purpose may become a very costly item. It may also be expensive and awkward to provide a separate drill motor for each drill bit used.

Therefore, it is an object of this invention to provide a tool selective device adapted to select a desired tool from a plurality of tools.

Another object of this invention is to provide a tool selective device adapted for use with a power driven device which can select a rotatable tool for engagement therewith without stopping the power driven means.

A further object of this invention is to provide a tool selective device which requires only moments to operate and is reliable in its operation.

Still another object of this invention is to provide a tool selective device which is adapted to use standard rotatable tools.

A still further object of this invention is to provide a tool selective device which provides an adequate bearing support for a tool being operated.

Yet another object of this invention is to provide a tool selective device which is adapted to extend and rotate one tool while other tools associated therewith are maintained in a retracted position.

An additional object of this invention is to provide a tool selective device which is adapted for use with standard commercially available power driven tools.

These and other objects will become apparent from the following detailed description taken in connection with the accompanying drawings in which:

Fig. 1 is a side elevational view of the tool selective device associated with a hand drill motor, Fig. 2 is a sectional view of the selective tool device, Fig. 3 is an end elevational view of the device of Fig. 1, Fig. 4 is a sectional view taken along line 4—4 of Fig. 2, and Fig. 5 is a fragmentary view taken along line 5—5 of Fig. 3.

In the embodiment illustrated in the drawing tool selective device 1 of this invention is shown associated with an ordinary electric drill motor 2. This type of drill motor is well-known in the art for which reason no detailed description of this device will be given herein. Such a motor includes a power take-off to which is normally attached a chuck for holding a drill bit. For the purposes of this invention the standard chuck of the drill motor is removed and the selective tool holder 1 is installed on the end of the drill motor housing.

Selective tool holder 1 therefore includes a fixed end support portion 4 adapted to be attached to the end of the drill motor in any suitable manner. For example, screws 5 may be used in providing this attachment. Also fixed to the drill motor housing with support member 4 is end plate 6 fastened thereto by means of screws 7. A shaft assembly 8 extends from end plate 6 so as to project perpendicularly from the plate and the drill housing. It is about this shaft assembly that rotatable housing portion 9 may rotate.

The power take-off of the drill motor will include a shaft 10 which is driven by the motor of the drill (not shown). This shaft is threaded on its end and the chuck of the drill motor normally is screwed thereto. For the selective tool device of this invention, however, drive shaft 11 is provided, this shaft having a threaded central opening adapted to receive shaft 10 so that drive shaft 11 rotates therewith and forms an extension thereof.

Rotatable housing portion 9 is provided with a plurality of cylindrical bores 12, 13, 14 and 15 extending therethrough. In the preferred embodiment illustrated four of these bores are utilized although other numbers are possible. These bores are arranged so that they are parallel to drive shaft 11 and are also located on a common circumference around the axis of shaft assembly 8 about which housing 9 rotates. As illustrated in Fig. 2 drive shaft 11 is adapted to be received within a bore, which in this instance is bore 12, and is freely rotatable therein.

Each of bores 12, 13, 14 and 15 contains a rotatable tool holding device 17. These devices may be of any suitable type but in any event are adapted to hold rotatable tools such as, for example, drills 18. These drills are standard commercially available drills and for use with this device will be normally of various sizes. They are held within tool holders 17 in a suitable manner, for example, by an ordinary chuck arrangement including a member 19 which is threadably received within chuck member 20. When member 19 is tightened within member 20 the shank of a drill bit 18 therein will be firmly gripped by these two members so that it will rotate therewith. Member 20 is received within outer sleeve 21 of the tool holding device, which outer member includes a shoulder 22 between portion 23 thereof of a relatively small diameter and portion 24 thereof having a relatively large diameter. Portion 24 is designed to fit closely within a cylindrical bore but to be freely rotatable relative thereto.

A spring 26 is also received in each of the cylindrical bores of the housing and by bearing against annular member 27 and shoulder 22 biases the tool holding device toward a retracted position wherein the drill will be entirely received within the housing as is the tool holding device in bore 14 at the bottom of Fig. 2. Member 21 of the tool holding device bears against end plate 29 of housing portion 9 which acts as a stop when the tool holding device is in this retracted position, but end plate 29 is provided with apertures 30 in alignment with the cylindrical bores of the housing so that the end of the tool holder is always accessible from the inner end of housing 9.

The shaft assembly 8 about which the housing portion 9 is free to rotate comprises a central rod member 31 which is received within a tubular member 32. Rod member 31 is integral with end plate 6 and therefore is fixed relative to the drill motor. Tube 32 is received within a central aperture that extends through housing portion 9. An elongated slot 33 is provided in tube 32 and extends in the direction of the axis of the tube for most of its length as illustrated in Fig. 2. Pin 34 projects from shaft 31 and is slidable within slot 33. Thus it is obvious that the housing assembly portion 9 may rotate about the exterior of tube 32 while tube 32 may be axially moved relative to shaft 31. In other words the housing assembly 9 may be moved axially to the left from the position illustrated along shaft 31 a distance permitted by the length of slot 33 which cooperates with pin 34 to limit the leftward travel. At the same time the housing assembly portion 9 may be rotated about the exterior of tube 32 which is angularly fixed to shaft 31 by reason of the projecting pin cooperating with slot 33. The left end of tube 32 is closed at 37 which by means of screw 38 retains a dust cover 39. The dust cover is complementary to the dimensions of the end of housing portion 9 and has a single aperture 40 therethrough. Spring 35, around the exterior of tube 32, is interposed between a shoulder on the tube and a shoulder in the housing, thus urging the tube to the right with respect to the housing. This action enables tube 32 to maintain dust cover 39 at all times in engagement with the end of housing 9.

When the tool selective device is in the position illustrated in Fig. 2 housing portion 9 is in its retracted position wherein it is adjacent the end of housing of the drill motor. Mounting shaft assembly 8 is so arranged that when the housing is in this retracted position one of the bores—in this case bore 12—is in alignment with the drive shaft 11 so that the drive shaft is received within one of the bores. When in this retracted position projecting lug 42 on the end of the drive shaft engages a slot 43 in a member 44 carried by sleeve 21 of the tool holding device. When lug 42 is within this slot it drivingly engages the tool holding device so that this device will be rotated by the drive shaft. Additionally it forces this member to the left end of housing portion 9 in opposition to the yieldable force exerted by spring 26 so that the chuck members 19 and 20 project from the housing and drill 18 is extended and ready for use. Rotation of drive shaft 11 by the drill motor will cause the tool holding device and drill 18 to rotate as the extended tool is now in position for cutting a workpiece. Replacement of drill bit 18 is easily accomplished because the chuck members of the tool holder extend beyond the housing when the tool holder is in its extended position.

When it is desired to select a different tool for operation, the housing portion 9 may be slid axially to the left along mounting shaft 31 so that eventually drive shaft 11 is removed from the interior of bore 12 and tool holding device 17 is no longer engaged by the drive shaft. This extended position of the housing is shown in phantom in Fig. 1. It is not necessary to stop the drill motor when this is done. When cap 29 at the extreme right of housing 9 clears the end of drive shaft 11, housing assembly 9 may be rotated so as to align a different bore with the drive shaft. When the bore containing a drill bit of desired size is aligned with the drive shaft, housing assembly 9 is again moved axially to the right causing lug 42 on the end of the drive shaft to engage the slot within the end of the tool holding device so that the tool holding device will be rotated thereby and moved to the extended position. Dust cover 39 is angularly fixed so that aperture 40 therethrough will always be aligned with drive shaft 11. Any of the bores in alignment with the drive shaft will therefore be automatically aligned with the aperture through the dust cover and thus free to be moved to the extended position. It is not necessary to stop the motor at any time during this operation because the clearance between opening 43 and lug 42 is sufficient that the lug will always seat within the opening even when rotating. Lug 42 may be slightly beveled on its end, as best seen in Fig. 4, to facilitate ready engagement with slot 43.

When the tool holding device is in its extended position as shown a portion of the exterior of sleeve 21 will be received within annular member 27. This member is constructed of bearing material so that this provides a support for the end of the tool holder. Likewise the exterior of portion 24 of member 21 may be coated with bearing material so that a second bearing is provided for this member and the interior of the bore of the housing. By these provisions the tool holding device is very firmly held in its rotatable position so that drill bit 18 will be adequately supported and will not tend to vibrate or wobble. Additional support for housing 9 is provided by fixed support member 4. When housing 9 is in the retracted position member 4, which has an opening complementary to the housing, extends well over the housing so that the housing is supported by this member and the device is given greater rigidity.

A suitable indexing and retaining arrangement is also provided with this device so that one of the cylindrical bores may be always exactly aligned with the drive shaft and housing 9 may be retained in its retracted position. In providing this, for example, there may be an arm 46 carried by housing portion 4 and provided with a slotted end in engagement with a pin 47. A spring 48 urges this arm in a direction to force the pin downwardly toward housing portion 9 which is rotatable within portion 4 (see Fig. 5). Four apertures 49 may be provided in housing portion 9 and arranged such that when a cylindrical bore is in exact alignment with the drive shaft pin 47 will be received within one of these apertures. This arrangement will also assure that the housing is retained in its retracted position yet it can be moved to the extended position by depressing the lever 46.

Thus it is readily apparent that we have provided a selective tool device which provides a simplified rapid means for using a desired rotatable tool member. The tools not in use are retained out of the way and protected, yet are instantly available upon rotation of the housing of the device without even stopping the drive shaft. Adequate bearing support is provided for the tools and these may be standard commercially available items such as ordinary drill bits.

It is not necessary that this selective tool device be utilized with an electric hand drill as shown for the preferred embodiment. It could be associated as well with a drill press or with any device which has a rotatable power take-off and is adapted to drive rotatable tools of any type. The term "body" as used in the claims is intended to include fixed portions of any such device and not merely the body of a hand drill.

The foregoing detailed description is given by way of illustration only and is not to be taken by way of limitation, the spirit and scope of the invention being limited only by the appended claims.

We claim:

1. A tool selecting arrangement for a device having a body and a rotatable means, said arrangement comprising drive shaft means attached to said rotatable means for rotation therewith; housing means; a plurality of rotatable tools carried by said housing means and movable relative thereto between a retracted and an operative position; and mounting means interconnecting said housing and said body whereby said housing is movably carried by said body, such movement individually and selectively bringing said tools into engagement with said drive shaft and maintaining a tool so engaged in said operative position.

2. A device as recited in claim 1 in which said mounting means comprises a shaft means adapted to be fixedly carried by said body, and a tubular member on said shaft whereby said tubular member is axially slidable on said shaft and said housing is rotatable on said tubular member.

3. A selective tool device comprising a body member; a rotatable drive shaft carried by said body member; a housing member; means interconnecting said housing member and said body member; a plurality of rotatable tools carried by said housing member and axially movable relative thereto between a retracted and an extended position, said tools being adapted to individually engage said rotatable shaft upon movement of said housing relative to said body member whereby said shaft selectively urges said tools to an extended position for rotation thereof.

4. A tool selecting device for a power-driven tool having a body portion and a rotatable member, said device comprising a drive shaft adapted for attachment to said rotatable member; a housing member, said housing having a plurality of angularly displaced parallel apertures extending therethrough; rotatable tool means in each of said apertures and movable between an extended position projecting from said housing and a retracted position within said housing; means in each aperture for retaining the tool means therein in said retracted position; and means adjustably attaching said housing to said body whereby said apertures are individually alignable with said drive shaft and the tool means therein is maintained in said extended position engaged by said drive shaft.

5. A device as recited in claim 4 including in each of said apertures bearing means interposed between the tool therein and said housing whereby said tools are rotatably carried thereby.

6. A selective tool device comprising a body portion; a drive shaft projecting from said body portion; a housing member, said member having a plurality of angularly displaced axially aligned apertures extending therethrough; a rotatable tool in each of said apertures and axially movable between an extended position projecting from said housing and a retracted position within said housing; resilient means in each aperture for biasing the tool therein toward said retracted position; shaft means interconnecting said housing and said body portion whereby said housing is rotatable relative to said body portion and axially movable along said shaft means between an extended position remote from said body portion and a retracted position adjacent said body portion whereby when in said extended position rotation of said housing individually aligns said apertures with said drive shaft, and axial movement of said housing to said retracted position when an aperture is so aligned brings the tool within such an aperture into engagement with said drive shaft and said drive shaft extends said tool beyond said housing in opposition to said yieldable means; and releasable means for retaining said housing in said retracted position.

7. A tool selecting device for a machine having a body portion and a rotatable member, said device comprising a drive shaft for attachment to said rotatable member whereby said drive shaft is rotatable thereby; housing means, said housing means including a plurality of parallel cylindrical apertures; means for mounting said housing means on said body, said mounting means including a slidable connection whereby said housing is axially movable between an extended position remote from said body and a retracted position adjacent said body, said mounting means including a rotatable connection whereby said housing means is rotatable about an axis remote from said drive shaft and parallel thereto whereby when said housing means is in said extended position said apertures are individually and selectively alignable with said drive shaft upon such rotative movement of said housing means and when in said retracted position said drive shaft extends within such an aligned aperture; a rotatable tool in each aperture and axially slidable therein, each tool including lug means on one end thereof; and resilient means biasing each of said tools toward said body whereby when said housing means is in said retracted position said drive shaft drivingly engages the lug means of a tool and maintains said tool in an extended position projecting from said housing.

8. A tool selecting device for a power-driven tool having a power take-off, said device comprising drive shaft means attached to said power take-off for rotation thereby; a housing, said housing having a plurality of apertures therethrough in axial alignment and angularly spaced one from the other, said apertures being equally spaced from a centrally disposed axis of said housing; a rotatable tool in each of said apertures and slidable therein; resilient means urging each of said tools to a retracted position within said housing; support shaft means interconnecting said housing and said body, said support shaft means being disposed along said axis and remote from said drive shaft means, said housing being rotatable about said support shaft means whereby said apertures are individually and seccessively alignable with said drive shaft means, said housing being axially movable relative to said support shaft means whereby in an extended position remote from said power take-off said housing is remote from said drive shaft means for permitting said rotative movement and alignment of said drive shaft means with an aperture, and whereby in a retracted position adjacent said power take-off said drive shaft means projects within an aperture for engagement with the rotatable tool therein thereby forcing said tool to an extended position in opposition to said yieldable means, said drive shaft means and each of said tools having means provided on the end thereof whereby when said drive shaft means engages a tool rotation of said drive shaft means rotates said engaged tool; and means for retaining said housing in said retracted position with said drive shaft means within an aperture of said housing.

9. A selective tool device comprising a fixed body portion having rotatable means associated therewith; drive shaft means associated with said rotatable means and projecting from said body portion; a housing member, said member having a plurality of cylindrical bores extending therethrough in parallelism with said drive shaft; a mounting shaft assembly parallel to said drive shaft and interconnecting said housing and said fixed body portion, said mounting shaft including a slipping connection whereby said housing member is axially movable relative to said body portion between a position remote therefrom and a position adjacent thereto, said mounting shaft further including a pivotal connection whereby said housing is rotatable relative to said body about the axis of said mounting shaft for individually and selectively aligning said bores with said drive shaft; retainer means for holding said housing in said retracted position when one of said bores is in alignment with said drive shaft whereby said drive shaft is received therein when said housing is in said retracted position; tool means supported in each of said bores and rotatable relative thereto, said tool means being axially slidable in said bores between an extended position and a retracted position; and resilient means for urging said tool means toward said retracted position, whereby when said drive shaft is received in a cylindrical bore the tool means therein is drivingly engaged by said drive shaft and moved to said extended position in opposition to said resilient means.

10. A tool selecting arrangement for a device having a body and a rotatable means, said device comprising a drive shaft connected with said rotatable means for rotation thereby; housing means; mounting shaft means parallel to said drive shaft interconnecting said housing and said body, said mounting shaft means providing a rotatable connection whereby said housing is rotatable relative to said body, and an axially slidable connection whereby said housing is axially movable between a retracted position adjacent said body and an extended position remote from said body, said housing having a plurality of apertures therethrough disposed about said mounting shaft a radial distance substantially equal to the distance between the axes of said mounting shaft means and said drive shaft and parallel thereto, whereby when said housing is in said extended position said apertures are individually and selectively alignable with said drive shaft and when in said retracted position said drive shaft is received within an aperture; tool means in each of said apertures and supported therein by said housing, each of said tool means being rotatable and axially slidable within such an aperture; resilient yieldable means urging each of said tool means to a normal retracted position wholly received within said housing, each of said tool means having a work engaging portion on one end thereof and a drive portion on the other end thereof whereby when said drive shaft is within an aperture said drive shaft drivingly engages the drive portion of a tool means therein and maintains said tool means in said extended position in opposition to said resilient means with said work engaging portion projecting beyond said housing.

References Cited in the file of this patent

UNITED STATES PATENTS

| Number | Name | Date |
|---|---|---|
| 1,104,517 | Landau | July 21, 1914 |
| 2,303,565 | Luna | Dec. 1, 1942 |